United States Patent
Liao et al.

(10) Patent No.: US 10,374,708 B1
(45) Date of Patent: Aug. 6, 2019

(54) OPTICAL COMMUNICATION SYSTEM UTILIZING INTELLIGENT DYNAMIC GAIN EQUALIZER DEVICE

(71) Applicant: Molex, LLC, Lisle, IL (US)

(72) Inventors: Yi Liao, San Jose, CA (US); Gongjian Hu, Marina, CA (US); Tian Zhu, Castro Valley, CA (US); Guijun Ji, Cupertino, CA (US); Lifu Gong, San Jose, CA (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/928,199

(22) Filed: Mar. 22, 2018

(51) Int. Cl.
  *H04B 10/00* (2013.01)
  *H04B 10/2507* (2013.01)
  *H01S 3/23* (2006.01)
  *H04J 14/02* (2006.01)
  *H04B 10/075* (2013.01)

(52) U.S. Cl.
  CPC ..... *H04B 10/25073* (2013.01); *H01S 3/2308* (2013.01); *H04B 10/075* (2013.01); *H04J 14/0221* (2013.01)

(58) Field of Classification Search
  CPC ............. H04B 10/25073; H04B 10/075; H04J 14/0221; H01S 3/2308
  USPC .......................................................... 398/25
  See application file for complete search history.

(56) References Cited

U.S. PATENT DOCUMENTS

| | | | | |
|---|---|---|---|---|
| 6,738,187 B2 * | 5/2004 | DeCusatis | ............. | H01S 5/0687 359/337 |
| 2010/0183307 A1 * | 7/2010 | Matsumoto | .......... | H04B 10/506 398/79 |
| 2014/0205281 A1 * | 7/2014 | Sone | .................... | H04J 14/0212 398/25 |
| 2017/0093515 A1 * | 3/2017 | Tanaka | ................. | H04B 10/564 |

* cited by examiner

*Primary Examiner* — Don N Vo
(74) *Attorney, Agent, or Firm* — Molex, LLC (57) ABSTRACT

An optical communication device and related method are provided for reducing power variations among wavelength division multiplexing (WDM) signals. The device includes a dynamic gain equalizer (DGE) coupled to an optical communication path carrying WDM optical signals. The DGE is controlled in response to signals generated by an optical channel monitor (OCM). The OCM monitors signals coming into the DGE and monitors the signals leaving the DGE to thus monitor the WDM spectrum for optical signal power variations and adjust the DGE to reduce the signal power variations.

12 Claims, 6 Drawing Sheets

OPTICAL COMMUNICATION SYSTEM UTILIZING INTELLIGENT DYNAMIC GAIN EQUALIZER DEVICE

TECHNICAL FIELD

This disclosure relates generally to the field of optical communications and more specifically to dynamic gain equalization for optical communication amplification systems.

BACKGROUND

In wavelength division multiplexing (WDM), a plurality of optical signals or channels are carried over a single optical fiber with each channel being assigned a particular wavelength. Optical signals or channels in a WDM system are frequently transmitted over silica-based optical fibers, which typically have relatively low loss at wavelengths within a range of 1525 nm to 1580 nm. WDM optical signal channels at wavelengths within this low loss "window" can be transmitted over distances of approximately 50-100 km without significant attenuation. For distances beyond 100 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers (EDFA) do not uniformly amplify light within the spectral region of 1525 to 1580 nm. For example, an optical channel at a wavelength of 1540 nm is typically amplified 4 dB more than an optical channel at a wavelength of 1555 nm. While such a variation in gain can be tolerated for a system with only one optical amplifier, it cannot be tolerated for a system with plurality of optical amplifiers or numerous, narrowly-spaced optical channels. In which case, much of the pump power supplies energy for amplifying light at the high gain wavelengths rather than amplifying the low gain wavelengths. As a result, low gain wavelengths suffer excessive noise accumulation after propagating through several amplifiers.

Accordingly, dynamic gain equalizers (DGE) have been used to balance the gain across channels and provide a substantially uniform spectral gain, that is, provide gain flatness. DGEs work well for static optical network systems; however, optical network systems are not static and channel degrading and DGE operation can change with temperature, component drift, aging and fiber plant maintenance among other considerations. Accordingly, optical channel monitoring (OCM) is needed to ensure that the DGE provides the necessary gain flatness despite changing conditions.

SUMMARY

Consistent with the present disclosure, an optical communication device is provided. The device has a dynamic gain equalizer and an optical channel monitor (OCM). The dynamic gain equalizer is coupled to an optical communication path so as to receive a signal set comprising a plurality of optical signals. Each optical signal is at a respective one of a plurality of wavelengths. The dynamic gain equalizer has an adjustable, wavelength dependent transmission spectrum configured to equalize the signal set across the plurality of wavelengths to produce an output signal set.

The optical channel monitor is configured to separate a first signal subset from the signal set before the dynamic gain equalizer, and to separate a second signal subset from the output signal set. The first signal subset is representative of the signal set, and the second signal subset is representative of the output signal set. The optical channel monitor further includes a control circuit configured to compare the first signal subset with the second signal subset and adjust the transmission spectrum in response to the comparison.

In embodiments, the optical channel monitor is configured so that the first signal subset is from about 3% to about 10% of the signal set, and the second signal subset is from about 3% to about 10% of the output signal set.

In some of the embodiments, the optical communication device further comprises an optical system shared between the optical channel monitor and the dynamic gain equalizer. In such embodiments, the optical channel monitor can be further configured to introduce the first signal subset to the optical system in parallel with the signal set to produce a first output subset, and to introduce the second signal subset to the optical system in parallel with the signal set to produce a second output subset. In such embodiments, the control circuit is configured to compare the first signal subset with the second subset by comparing the first output subset to the second output subset and adjust the transmission spectrum in response to the comparison.

In some of the above embodiments, the optical channel monitor can comprise a first OCM and a second OCM. The first OCM is configured to separate the first signal subset from the signal set, and the second OCM is configured to separate the second signal subset from the output signal set. Where applicable, the first OCM is further configured to introduce the first signal subset to the optical system in parallel with the amplified signal set to produce a first output subset, and the second OCM is further configured to introduce the second signal subset to the optical system in parallel with the signal set to produce a second output subset.

Some embodiments can have a first optical amplifier coupled to the optical communication path such that the first optical amplifier imparts optical amplification to the plurality of wavelengths prior to the signal set receipt by the digital gain equalizer. In some of these embodiments, a second optical amplifier can be coupled to the optical communication path so as to receive the output signal set from the dynamic gain equalizer and produce an amplified output signal set. In some embodiments using multiple optical amplifiers, the second OCM can separate the second signal subset from the amplified output signal set. In other embodiments using multiple optical amplifiers, the second OCM can separate the second signal subset from the output signal set prior to the second optical amplifier.

In many of the above embodiments, the optical system is of the type having a polarization separation system, a wavelength dispersion system and a modulation device.

Also consistent with this disclosure, an optical communication method is provided. The method includes the following steps:

introducing an optical signal set into an optical system, wherein the optical system has an adjustable, wavelength dependent transmission spectrum configured to equalize the optical signal set across the plurality of wavelengths; to thus produce an output signal set from the optical signal set;

separating a first signal subset from the optical signal set prior to introducing the optical signal set into the optical system;

introducing the first signal subset into the optical system to thus produce a first output subset from the first signal subset;

separating a second signal subset from the output signal set wherein the first signal subset is representative of the output signal set;

introducing the second signal subset to the optical system to produce a second output subset;

comparing the first output subset with the second output subset; and adjusting the transmission spectrum in response to the comparison.

In the method, the first signal subset is can be from about 3% to about 10% of the amplified signal set, and the second signal subset can be from about 3% to about 10% of the output signal set.

In some embodiments, the method further comprises introducing the optical signal set to a first optical amplifier prior to separating the first signal subset, and amplifying the plurality of wavelengths in the first optical amplifier. In some of these embodiments, the method further comprises introducing the output signal to a second optical amplifier; and amplifying wavelengths in the output signal set within the second optical amplifier.

In some embodiments, the step of separating a second signal subset from the output signal set and the step of introducing the second signal subset to the optical system, both occur after amplifying wavelengths in output signal set within the second optical amplifier. In other embodiments, the step of separating a second signal subset from the output signal set and the step of introducing the second signal subset the optical system, both occur before amplifying wavelengths in output signal set within the second optical amplifier.

In some embodiments, equalizing the optical signal set across the plurality of wavelength includes polarization separation, wavelength dispersion and impinging the plurality of wavelengths on a modulation device.

BRIEF DESCRIPTION OF THE DRAWINGS

The present invention is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

An optical communication device and related method are provided for reducing power variations among wavelength division multiplexing (WDM) signals. The device includes a dynamic gain equalizer (DGE) coupled to an optical communication path carrying WDM optical signals. Each optical signal is at a respective one of a plurality of wavelengths. The DGE adjusts the power associated with each channel on substantially a channel-by-channel basis so that the WDM optical signal has a desired power spectrum. The DGE is controlled in response to signals generated by an optical channel monitor (OCM—sometimes referred to as an optical performance monitor). The OCM monitors signal coming into the DGE and monitors the signal leaving the DGE to thus monitor the WDM spectrum for optical signal power variations, typically ones falling outside a given tolerance. The OCM compares the monitored signals to adjust the DGE to reduce the signal power variations. Typically, one DGE is associated with an amplifier or a group of amplifiers so that multiple DGEs are provided in a system having many groups of such amplifiers. In accordance with this disclosure, at least one OCM is associated with each DGE, but more typically, two OCMs will be associated with each DGE so as to monitor a signal both before and after the associated DGE. In some of the preferred embodiments, the DGE and one or more OCMs share a common optical system.

Figure 1:
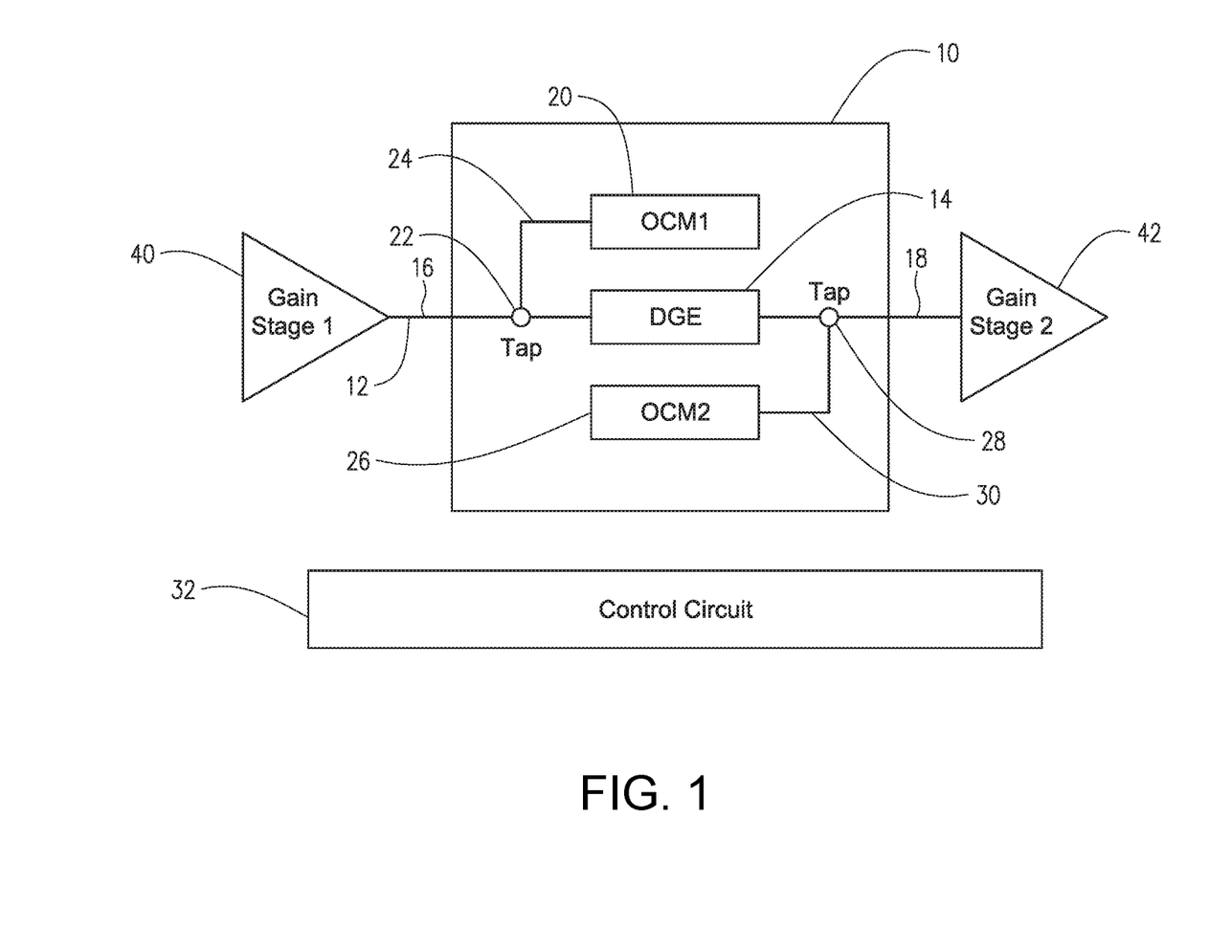
FIG. 1 is a schematic representation of a portion of an optical network including an optical communication device in accordance with some embodiments.

Turning now to FIG. 1, an optical communication device 10 in accordance with the current disclosure is schematically illustrated. In particular, device 10 includes a DGE 14 coupled to an optical communication path 12 carrying WDM optical signals. DGE 14 is coupled to path 12 so as to receive a signal set 16 comprising plurality of optical signals. Each optical signal is at a respective one of a plurality of wavelengths. The dynamic gain equalizer has an adjustable, wavelength dependent transmission spectrum configured to equalize the signal set across the plurality of wavelengths to produce an output signal set 18.

Device 10 further includes a first OCM 20 and a second OCM 26. First OCM 20 can include a first tap 22, which separates a first signal subset 24 from the signal set before signal set 16 enters DGE 14. Similarly, second OCM 26 can include a second tap 28, which separates a second signal subset 30 from the output signal set 18. In the current embodiment, first tap 22 and second tap 28 are described as being part of first OCM 20 and second OCM 26, respectively. Alternatively, each tap can be separate from an associated OCM as long as they are configured to feed a signal subset to an associated OCM.

As will be realized from the above, first signal subset 24 is representative of signal set 16, and second signal subset 30 is representative of the output signal set 18. By "representative", it is meant that the signal subset has a wavelength distribution and amplitude consistent with the wavelengths making up the associated signal set. Generally, the first signal subset is separated in first tap 22 such that it is about 3% to about 10% of the signal set, and the second signal subset is separated in second tap 28 so that it is from about 3% to about 10% of the output signal set.

The optical channel monitor system (first OCM 20 and second OCM 26) further includes a control circuit 32 configured to compare first signal subset 24 with second signal subset 30 and to adjust the transmission spectrum of DGE 14 in response to the comparison.

Optical communication device 10 will generally be used in connection with the amplification of a signal set being transmitted through an optical network. Thus, as illustrated in FIG. 1, a first amplifier 40 can amplify the signal set power prior to the signal set being introduced into optical communication device 10. As described above, the amplification of the signal set will typically have power variations among the different wavelength signals making up the signal set's signals. That is signals at certain wavelengths will be amplified more than the signals at other wavelengths. DGE 14 is used to correct these variations or to "flatten" the signal set.

While first amplifier 40 can be used alone, it will often be used in conjunction with at least one other amplifier. As illustrated in FIG. 1, a second amplifier 42 can be positioned in the optical network to receive the output signal from DGE 14. Although each is shown as a single amplifier, first amplifier 40 and/or second amplifier 42 can comprise systems of multiple amplifiers, typically in series. Generally, amplifiers 40 and 42 can be erbium-doped fiber amplifiers (EDFA) as are known in the art.

In one embodiment, first OCM 20 of optical communication device 10 directly taps the signal set to obtain first signal subset 24 without the first signal subset 24 being processed by DGE 14, and second OCM 26 directly taps output signal set 18, which has been processed by DGE 14, to obtain second signal subset 30, which is not further processed by DGE 14. The first signal subset 24 and second signal subset 30 can then be processed in the first OCM 20 and second OCM 16, respectively, based upon the separate processing systems of each of those OCMs.

In an alternative embodiment, DGE 14, first OCM 20 and second OCM 16 have a shared optical system for processing of signals. For example, first OCM 20 can be configured to separate first signal subset 24 from signal set 16 prior to introduction of signal set 16 into DGE 14. Subsequently, first signal subset 24 is introduced into the optical system of DGE 14 in parallel with signal set 16. Similarly, the second OCM 26 can be configured to separate second signal subset 30 from output signal set 18 and then introduce the second signal subset to the optical system of DGE 14 in parallel with signal set 16. In other embodiments, the optical system might be contained within one of the optical channel monitors instead of DGE 14.

Figure 2:
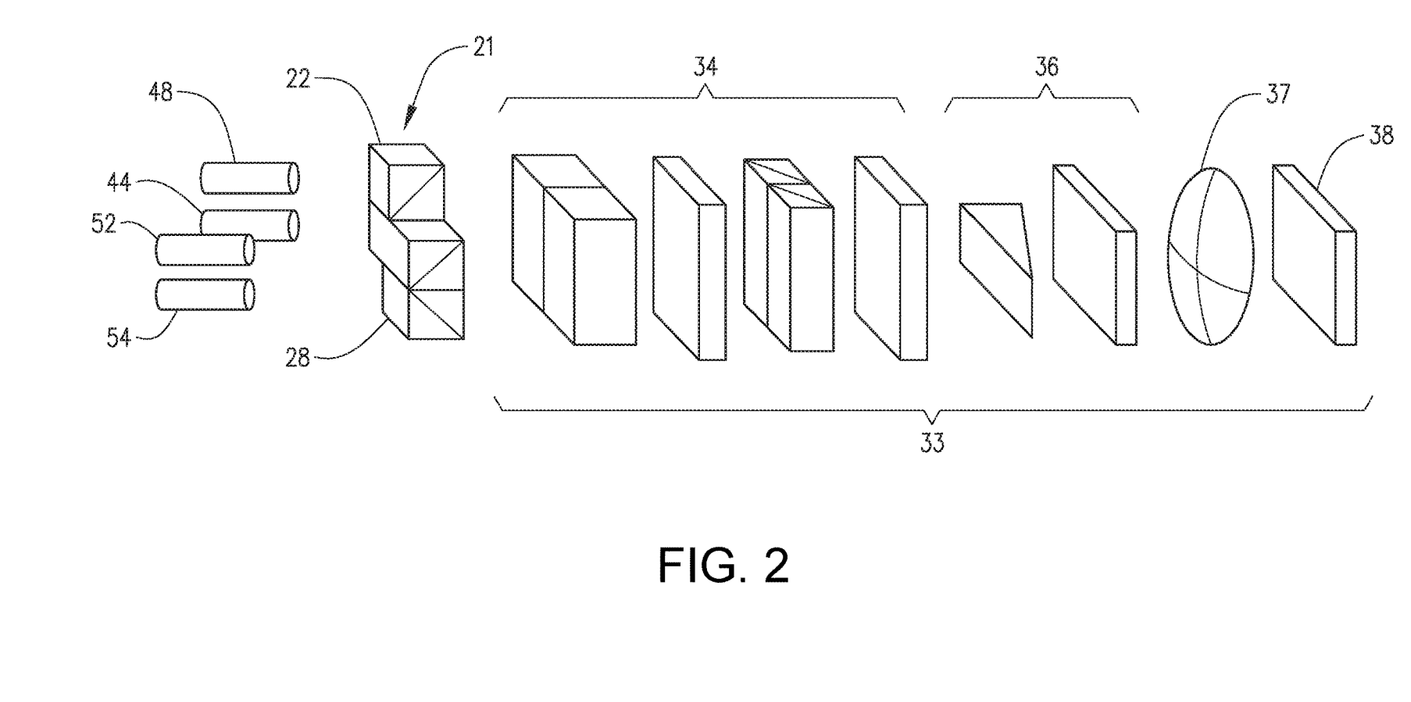
FIG. 2 is a schematic representation of a common optical system that can be used for the dynamic gain equalizer and optical channel monitor in accordance with some of the embodiments of FIG. 1.
Figure 3:
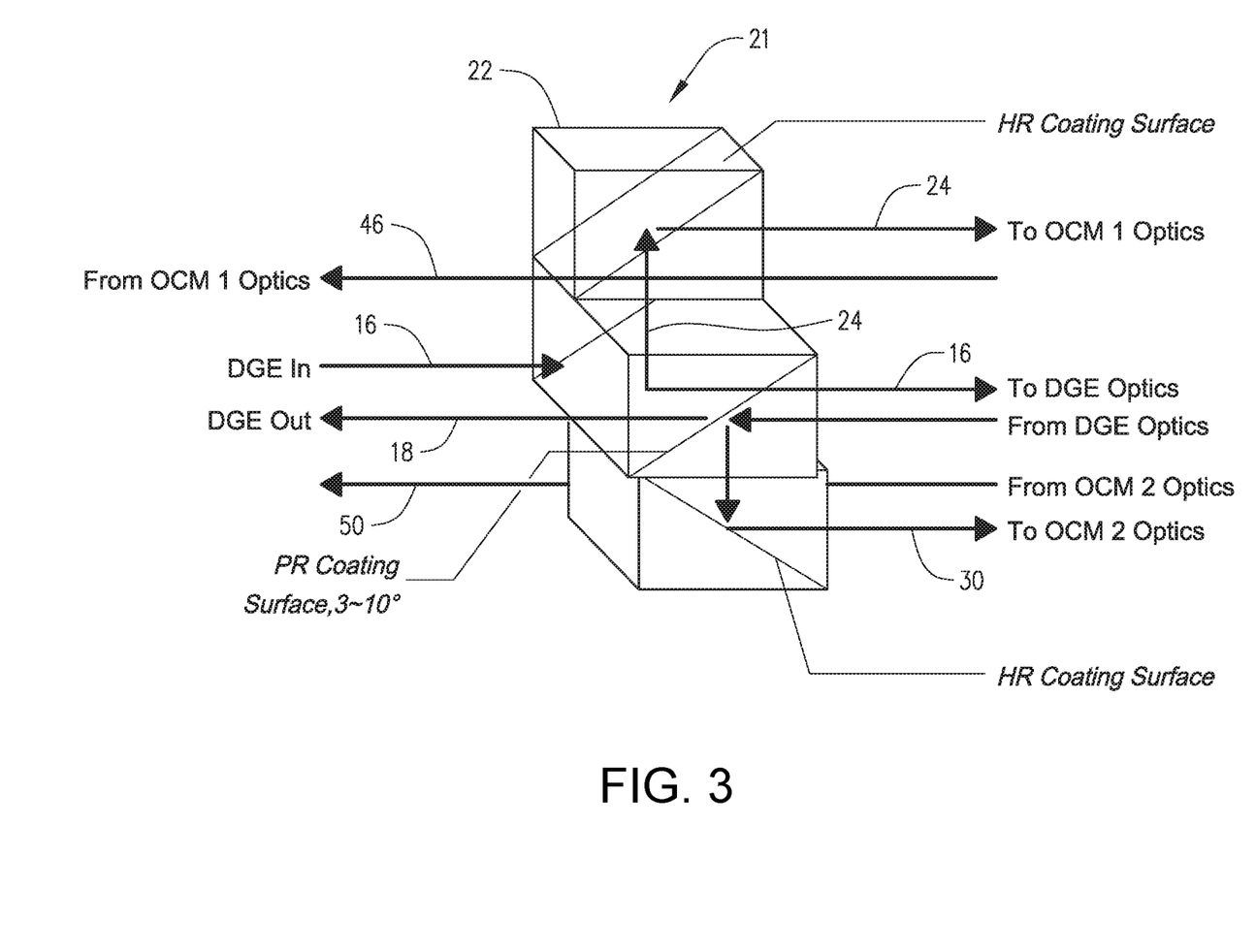
FIG. 3 is an enlargement of a tap system which can be used in the embodiments of FIG. 2.

This alternative embodiment can be better understood with reference to FIGS. 2 and 3. As illustrated, input optical fiber 44 introduces signal set 16 to tap system 21. Tap system 21 comprises tap 22 and tap 28, which can be separate units or can be part of a common tap unit or prism system. As illustrated in FIGS. 2 and 3, tap 22 and tap 28 share a common center unit where a portion of the signal beam is split off from the signal set, and have separate redirecting prisms. Thus, as shown, tap 22 is the top portion of tap system 21 and tap 28 is the bottom portion of tap system 21.

As best seen in FIG. 3, tap 22 is an optical tap where signal set 16 impinges on a partial-reflection coating surface such that the majority of signal set 16 is transmitted directly through tap 22 but a minor portion, first signal subset 24, is reflected at 90° to the incoming signal set. The reflected portion will be representative of the signal set, thus the reflected portion has a wavelength distribution consistent with the wavelengths making up signal set 16. Generally, the majority of the signal set will be at least 80% of signal set 16 and more typically at least 90% or at least 95% of signal set 16. First signal subset 24 then impinges upon a high-reflection coating to change its direction to be parallel with signal set 16. From tap 22, signal set 16 and first signal subset 24 are introduced to optical system 33.

In FIG. 2, one example of and optical system 33 suitable as a shared optical system for the DGE and OCMs is depicted. Optical system 33 comprises a polarization conditioning 34, a wavelength dispersion system 36 and a modulation device 38, as are known in the art. Additionally, optical system 33 can utilize one or more focusing lenses 37. Optical signals introduced into optical system 33 can have random polarization; therefore, polarization conditioning is performed by polarization conditioning system 34. During polarization, conditioning orthogonal polarities are separated from each other and then one of the two orthogonal polarities is flipped to thus produce polarized signals having the same polarity. These polarized signals are then undergo color dispersion in wavelength dispersion system 36. Color dispersion separates the polarized signals such that there is spatial separation of the signals by wavelengths. Consequentially, the polarized state of each wavelength can be modulated independently in modulation device 38. Modulation device 38 can be a liquid crystal cell array (such as a liquid crystal on silicon device) that includes a number of separate polarizing modulation cells, e.g., pixel cells. Each pixel cell can be independently controlled such that the pixel either rotates the polarization orientation of light incident on the pixel or does not change the polarization. By this method, signal set 16 can be attenuated at modulating device 38 to flatten the signal set. Additionally, at modulation device 38, first signal subset 24 can undergo wavelength selection for monitoring by first OCM 20.

Once the wavelengths of signal set 16 and first signal subset 24 have been modulated at first modulation device 38, they are reflected back through wavelength dispersion system 36 and polarization conditioning system 34 to basically reintegrate the wavelengths and produced a non-polarized or random polarized output signal set 18 and to produce a first output signal subset 46 for first OCM 20.

Turning back to FIG. 3, first output signal subset 46 passes directly through or past tap 22 and is introduced to output optical fiber 48 (FIG. 2) to be sent to control circuit 32. Output signal set 18 is split as it passes through tap 28 at the partial-reflection coating surface such that the majority of output signal set 18 is transmitted directly through tap 28 and is introduced into output optical fiber 52 to be reintroduced into the optical network. (Those skilled in the art will appreciate that tap 22 and tap 28 share the same central splitting prism in the illustrated embodiment.) A minor portion, second signal subset 30, is reflected at 90° to the output signal set 18. The reflected portion will be representative of output signal set 18, thus the reflected portion has a wavelength distribution consistent with the wavelengths making up output signal set 18. Generally, the majority of the output signal set will be at least 80% of output signal set 18 entering tap 28 and more typically at least 90% or at least 95% of output signal set 18 entering tap 28. Second signal subset 30 then impinges upon a high-reflection coating to change its direction to undergo parallel processing with signal set 16 and first signal subset 24 by the optical system.

The processing is similar to that described above for first signal subset 24. Thus, second signal subset 30 can undergo wavelength selection for monitoring by second OCM monitor 26 at modulation device 38 and subsequently is reintegrated to produced a non-polarized or random polarized second output signal subset 50. As will be realized, second output signal subset 50 passes through or past tap 28 to be introduced into output optical fiber 54 (FIG. 2) and sent to control circuit 32. Within control circuit 32, first output signal subset 46 and second output signal subset 50 can be compared. Based on the comparison, the modulation by modulation device 38 can be adjusted to thereby adjust the transmission spectrum of DGE 14 to equalize the signal set 16 across the plurality of wavelengths to produce a flatten output signal set 18.

The optical communication device illustrated in FIGS. 1-3 operates as follows. Signal set 16 is sent through an optical communication path of an optical network. Signal set 16 comprises a plurality of optical signals, each optical signal being at a respective one of a plurality of wavelengths. Signal set 16 is introduced into first optical amplifier 40 connected to the optical communication path. The plurality of wavelengths making up signal set 16 is amplified within first optical amplifier 40.

Next, first signal subset 24 is separated from signal set 16, wherein first signal subset 24 is representative of optical signal set 16. Optical signal set 16 and first signal subset 24 are introduced into the optical system 33, which has an adjustable, wavelength dependent transmission spectrum configured to equalize the optical signal set across the plurality of wavelength. Thus within optical system 33, output signal set 18 is produced from optical signal set 16. Additionally, a first output signal subset 46 is produced from first signal subset 24. For example, first output signal subset 46 can be produced by selecting specific wavelengths for monitoring from first signal subset 24.

Subsequently, second signal subset 30 is separated from output signal set 18, wherein second signal subset 30 is representative of output signal set 18. Second signal subset 30 is introduced to the optical system to produce second output signal subset 50. For example, second output signal subset 50 can be produced by selecting specific wavelengths for monitoring from output signal set 18. Generally, the selected specific wavelengths will match those selected for first output signal subset 46. Following this, first output signal subset 46 is compared with second output signal subset 50, and the transmission spectrum of DGE 14 is adjusted in response to the comparison. Output signal set 18 can be introduced into second optical amplifier 42 connected to the optical communication path, and the plurality of wavelengths making up output signal set 18 can be amplified within second optical amplifier 42.

Figure 4:
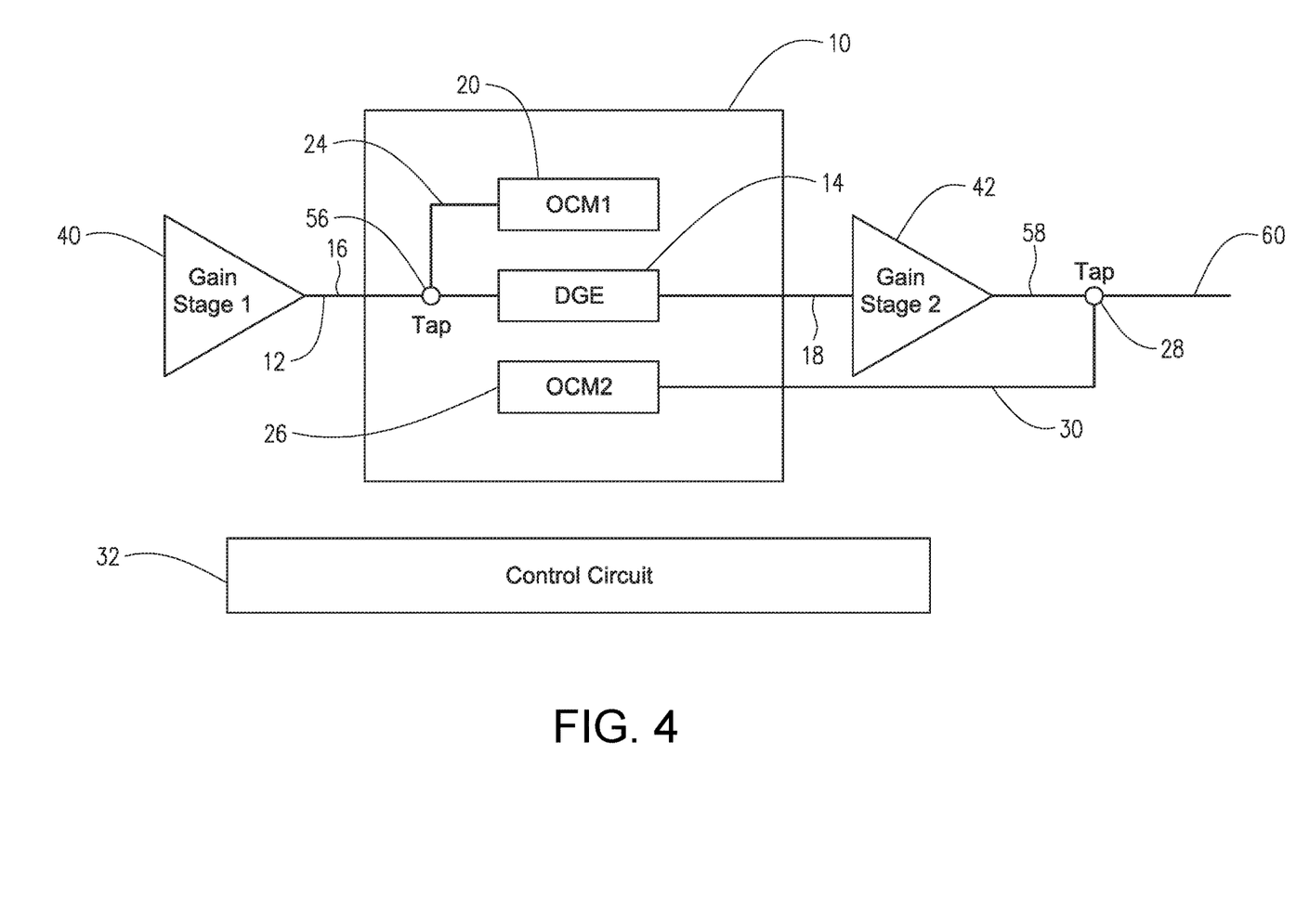
FIG. 4 is a schematic representation of a portion of an optical network including an optical communication system in accordance with some alternative embodiments.

Turning now to FIG. 4, another embodiment of the optical communication device 10 is illustrated. The system illustrated in FIG. 4 is similar to that illustrated in FIG. 1, except second optical tap 28 is located after second amplifier 42. Accordingly, output signal set 18 from DGE 14 undergoes amplification in second amplifier 42 prior to separation of second signal subset 30.

Figure 5:
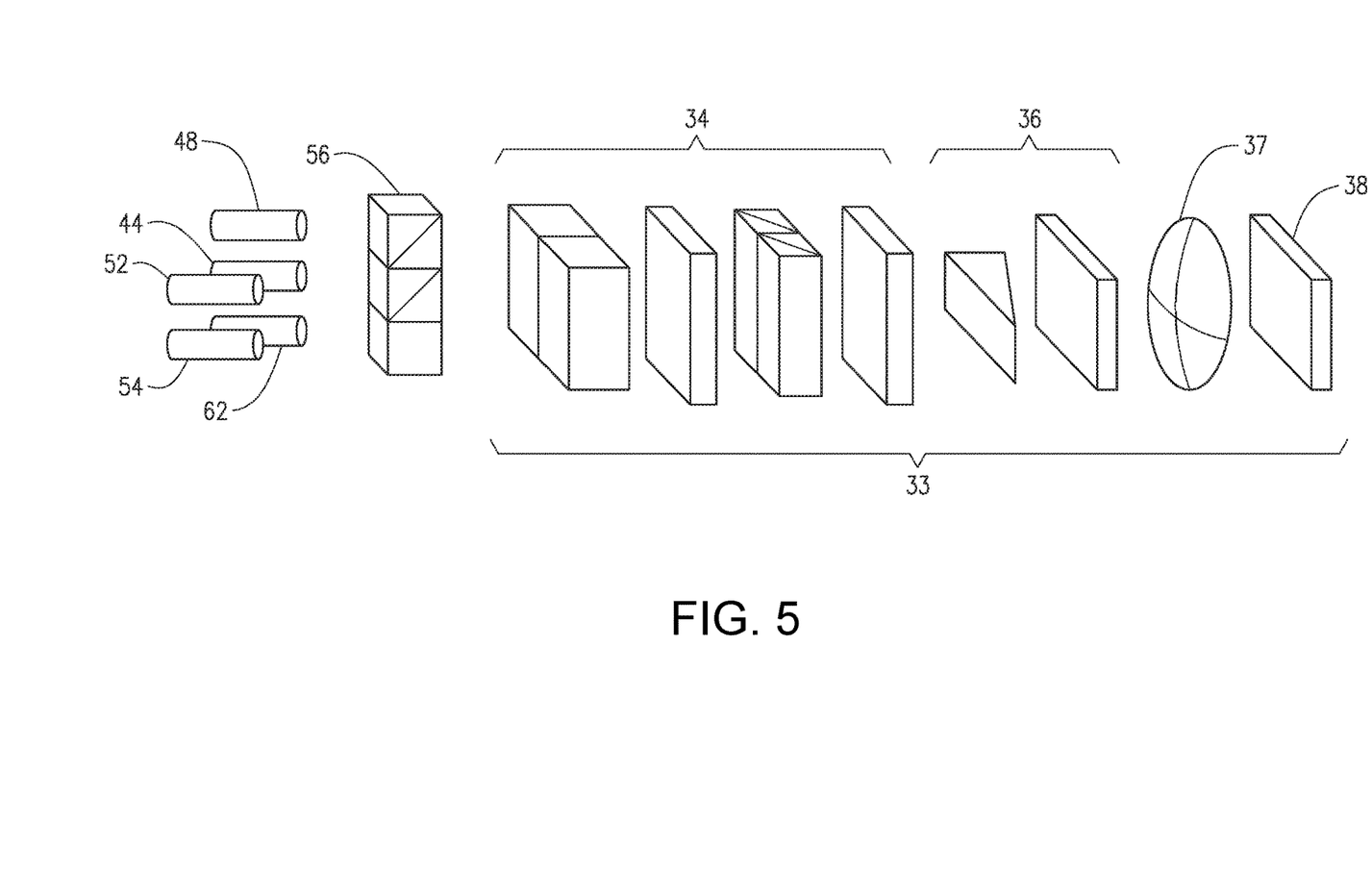
FIG. 5 is a schematic representation of a common optical system that can be used for the dynamic gain equalizer and optical channel monitor in accordance with some of the embodiments of FIG. 4.
Figure 6:
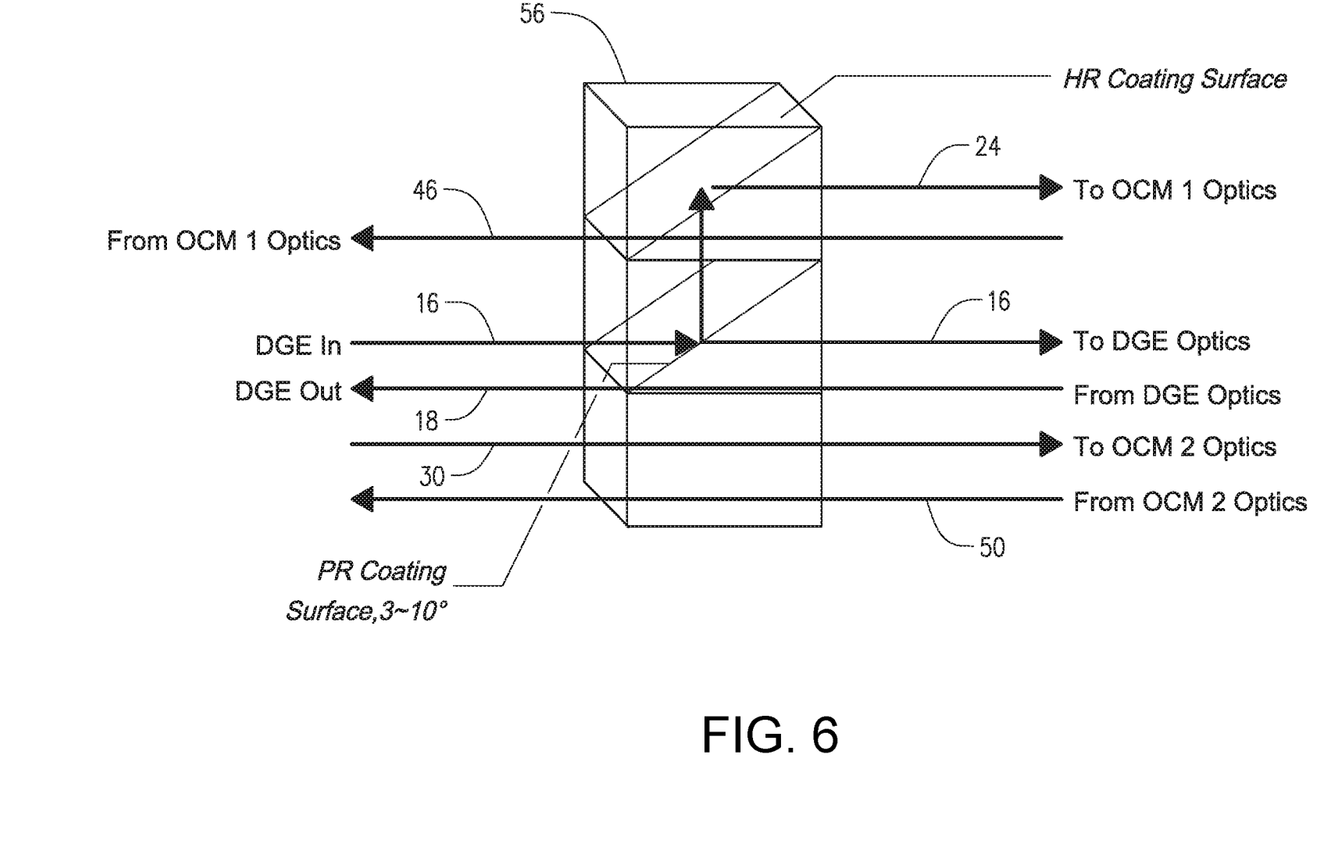
FIG. 6 is an enlargement of a first tap which can be used in the embodiments of FIG. 5.

Referring to FIGS. 5 and 6, input optical fiber 44 introduces signal set 16 to a first optical tap 56. Similar to the embodiment of FIGS. 2 and 3, tap 56 is an optical tap where signal set 16 impinges on a partial-reflection coating surface such that the majority of signal set 16 is transmitted directly through tap 56 but a minor portion, first signal subset 24, is reflected at 90° to the incoming signal set. First signal subset 24 then impinges upon a high-reflection coating to change its direction to be parallel with signal set 16. From tap 56, signal set 16 and first signal subset 24 are introduced to optical system 33. Signal set 16 and first signal subset 24 are then processed in optical system 33 as previously described for FIGS. 2 and 3. However, output signal set 18 is not split at tap 56. Instead, output signal set 18 passes through or past tap 56 without splitting the beam and is introduced into output optical fiber 52. Output optical fiber 52 is connected with second amplifier 42 so that output signal set 18 is introduced into second amplifier 42 for application of signal set. The thus amplified output signal set 58 is introduced into second tap 28 (FIG. 4) where the beam is split. Second tap 28 has a partial-reflection coating surface such that the majority of the amplified output signal set 58 is transmitted directly through tap 28 and is introduced into optical fiber 60 which is part of the optical communication path of the optical network. A minor portion, second signal subset 30, is reflected at 90° to the incoming signal set. Second signal subset 30 then is directed through optical fiber 62 to be introduced to optical system 33 in parallel with signal set 16 and first signal subset 24. The processing is similar to that described above. Thus, second signal subset 30 can undergo wavelength selection for monitoring by second OCM 26 at modulation device 38 and is subsequently reintegrated to produce a non-polarized or random polarized second output signal subset 50. As will be realized, second output signal subset 50 can pass through tap 56 to be introduced into output optical fiber 54 (FIG. 5) and sent to control circuit 32. Within control circuit 32, first output signal subset 46 and second output signal subset 50 can be compared. Based on the comparison, the modulation by modulation device 38 can be adjusted to thereby adjust the transmission spectrum of DGE 14 to equalize the signal set 16 across the plurality of wavelengths to produce a flatten output signal set 18.

The optical communication device illustrated in FIGS. 4-6 operates similar to the operation of the embodiment of FIGS. 1-3. Signal set 16 is sent through an optical communication path of an optical network. Signal set 16 comprises a plurality of optical signals, each optical signal being at a respective one of a plurality of wavelengths. Signal set 16 is introduced into first optical amplifier 40 connected to the optical communication path. The plurality of wavelengths making up signal set 16 is amplified within first optical amplifier 40.

Next, first signal subset 24 is separated from signal set 16, wherein first signal subset 24 is representative of optical signal set 16. Optical signal set 16 and first signal subset 24 are introduced into optical system 33, which has an adjustable, wavelength dependent transmission spectrum configured to equalize the optical signal set across the plurality of wavelengths. Thus within optical system 33, output signal set 18 is produced from optical signal set 16. Additionally, a first output signal subset 46 is produced from first signal subset 24. For example, first output signal subset 46 can be produced by selecting specific wavelengths for monitoring from first signal subset 24.

Subsequently, output signal set 18 is introduced to second optical amplifier 42, which is connected to the optical communication path. The plurality of wavelengths making up output signal set 18 is amplified within first optical amplifier 40. Second signal subset 30 is separated from the thus amplified output signal set 58, wherein second signal subset 30 is representative of output signal set 18. The amplified output signal set 58 is introduced to the optical commutation path of the optical network.

Second signal subset 30 is introduced to optical system 33 to produce second output signal subset 50. For example, second output signal subset 50 can be produced by selecting specific wavelengths for monitoring from amplified output signal set 58. Generally, the selected specific wavelengths will match those selected for first output signal subset 46. Following this, first output signal subset 46 is compared with second output signal subset 50, and the transmission spectrum of DGE 14 is adjusted in response to the comparison.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. An optical communication device, comprising:
   a dynamic gain equalizer coupled to an optical communication path so as to receive an input signal set comprising a plurality of optical signals, each optical signal being at a respective one of a plurality of wavelengths and to transmit an output signal set;
   an optical channel monitor (OCM) configured to:
   separate a first signal subset from the input signal set, wherein the first signal subset is representative of the input signal set;
   separate a second signal subset from the output signal set, wherein the second signal subset is representative of the output signal set; and
   wherein the dynamic gain equalizer is configured to compare the first signal subset with the second signal subset and to equalize signal amplitudes across the output signal set, in response to the comparison.

2. The optical communication device of claim 1, wherein the optical channel monitor is configured so that the first signal subset is from about 3% to about 10% of the input signal set, and the second signal subset is from about 3% to about 10% of the output signal set.

3. The optical communication device of claim 1, where in the optical channel monitor comprises a first OCM and a second OCM, and wherein the first OCM is configured to separate the first signal subset from the input signal set, and the second OCM is configured to separate the second signal subset from the output signal set.

4. The optical communication device of claim 3, further comprising a first optical amplifier coupled to the optical communication path such that the first optical amplifier imparts optical amplification to the plurality of wavelengths prior to the input signal set receipt by the digital gain equalizer.

5. The optical communication device of claim 4, further comprising a second optical amplifier coupled to the optical communication path so as to receive the output signal set from the dynamic gain equalizer and produce an amplified output signal set, and wherein the second OCM separates the second signal subset from the amplified output signal set.

6. The optical communication device of claim 4, further comprising a second optical amplifier coupled to the optical communication path so as to receive the output signal set from the dynamic gain equalizer and produce an amplified output signal set, and wherein the second OCM separates the second signal subset from the output signal set prior to the second optical amplifier.

7. The optical communication device of claim 1, wherein the dynamic gain equalizer further comprises an optical system shared between and optically coupled to the optical channel monitor and the dynamic gain equalizer, and wherein the optical system is of the type having a polarization separation system, a wavelength dispersion system optically coupled to the polarization separation system, and a modulation device optically coupled to the wavelength dispersion system.

8. The optical communication device of claim 7, wherein the OCM comprises a tap system, optically coupled to the optical system, that separates the first signal subset from the input signal set and separates the second signal subset from the output signal set.

9. The optical communication device of claim 8, wherein the tap system comprises a single unit optically coupled between input/output optical fibers and the optical system.

10. The optical communication device of claim 8, wherein the OCM further comprises one or more focusing lenses optically coupled between the wavelength dispersion system and the modulation device.

11. The optical communication device of claim 7, wherein the modulation device comprises a liquid crystal cell array.

12. The optical communication device of claim 11, wherein the liquid crystal cell array comprises a plurality of polarizing modulation cells, wherein each polarizing modulation cell is configured to independently adjust a polarization of light incident on the polarizing modulation cell.

* * * * *